United States Patent
Yonezawa

(10) Patent No.: US 11,281,927 B2
(45) Date of Patent: Mar. 22, 2022

(54) IMAGE PROCESSING APPARATUS, IMAGE PROCESSING METHOD, AND NON-TRANSITORY COMPUTER-READABLE RECORDING MEDIUM

(71) Applicant: CANON KABUSHIKI KAISHA, Tokyo (JP)

(72) Inventor: Keiko Yonezawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 16/670,008

(22) Filed: Oct. 31, 2019

(65) Prior Publication Data

US 2020/0151487 A1 May 14, 2020

(30) Foreign Application Priority Data

Nov. 9, 2018 (JP) .............................. JP2018-211699

(51) Int. Cl.
| | |
|---|---|
| *G06K 9/32* | (2006.01) |
| *G06K 9/38* | (2006.01) |
| *G06T 5/00* | (2006.01) |
| *H04N 19/167* | (2014.01) |
| *H04N 19/59* | (2014.01) |
| *H04N 19/124* | (2014.01) |

(52) U.S. Cl.
CPC ............. *G06K 9/3241* (2013.01); *G06K 9/38* (2013.01); *G06T 5/007* (2013.01)

(58) Field of Classification Search
CPC ...... G06K 9/3241; G06K 9/38; G06K 9/3233; G06T 5/007; H04N 19/59; H04N 19/167; H04N 19/176; H04N 19/124
See application file for complete search history.

(56) References Cited

U.S. PATENT DOCUMENTS

| | | | |
|---|---|---|---|
| 7,130,451 B2 | 10/2006 | Harrington et al. | |
| 7,542,613 B2 | 6/2009 | Fujiyama et al. | |
| 9,224,062 B2 | 12/2015 | Wu et al. | |
| 10,157,476 B1 * | 12/2018 | Idrisov | ............... G06K 9/00771 |
| 11,023,761 B2 * | 6/2021 | Xiong | .................. G06K 9/6298 |
| 2006/0062480 A1 * | 3/2006 | Fujiyama | ............. H04N 19/137 |
| | | | 382/232 |

(Continued)

FOREIGN PATENT DOCUMENTS

| | | | | |
|---|---|---|---|---|
| CN | 108986526 A | * | 12/2018 | |
| CN | 112534818 A | * | 3/2021 | ............. H04N 19/61 |

(Continued)

*Primary Examiner* — Mohammed Rachedine

(74) *Attorney, Agent, or Firm* — Venable LLP

(57) ABSTRACT

An image processing apparatus comprises a specific object detection unit configured to detect a specific object from a moving image, a setting unit configured to set, in the moving image, based on a position of the specific object, a region of interest which is a region for performing an encoding process that produces a relatively higher image quality than in another region other than the region of interest, a moving object detection unit configured to detect a moving object from the moving image, and an encoding unit configured to perform an encoding process using, in the region of interest, an encoding parameter that can produce a relatively higher image quality than an encoding parameter used in the other region, when the moving object is detected in the region of interest.

13 Claims, 8 Drawing Sheets

(56) References Cited

U.S. PATENT DOCUMENTS

| | | | |
|---|---|---|---|
| 2015/0043771 A1* | 2/2015 | Wu | G06K 9/6256 |
| | | | 382/103 |
| 2019/0007678 A1* | 1/2019 | Perez-Ramirez | H04N 19/109 |
| 2019/0007690 A1* | 1/2019 | Varadarajan | H04N 19/124 |
| 2019/0238859 A1 | 8/2019 | Yonezawa | |
| 2020/0322639 A1* | 10/2020 | Lee | H04N 21/44008 |
| 2021/0124968 A1* | 4/2021 | Ashani | G06K 9/622 |

FOREIGN PATENT DOCUMENTS

| | | | | |
|---|---|---|---|---|
| CN | 110830757 B | * | 4/2021 | |
| JP | 2006-093784 A | | 4/2006 | |
| JP | 2015-036980 A | | 2/2015 | |
| WO | WO-2019021853 A1 | * | 1/2019 | H04N 19/20 |

\* cited by examiner

IMAGE PROCESSING APPARATUS, IMAGE PROCESSING METHOD, AND NON-TRANSITORY COMPUTER-READABLE RECORDING MEDIUM

BACKGROUND OF THE INVENTION

Field of the Invention

The present invention relates to an image encoding technique.

Description of the Related Art

In recent years, along with popularization of smartphones, digital video cameras, and the like, there are increasing opportunities to capture an image and generate image data. On the other hand, the capacity of storage for recording the data and the communication band for transmitting and receiving the data are limited. Therefore, a technique for efficiently compressing image data is required. There is known a standard called H.264/AVC as an image compression method. A standard called H.265/HEVC has also become widespread.

In an image compression encoding technique, parameters such as a quantization parameter are defined in order to adjust the image quality. By using these parameters, it is required to reduce the amount of data as much as possible while preventing deterioration of image quality. More specifically, there is a method of extracting a region of interest in an image as an ROI (Region of Interest) and using the different quantization parameters between the ROI and a remaining region. Conventionally, there is known a method in which a user sets a region of interest as an ROI (referred to as a user-set ROI, hereinafter), and the image quality of this region alone is enhanced. Furthermore, there is also known a method of setting an ROI (referred to as a dynamic ROI, hereinafter) based on a detection result of a moving object, a moving person, or a moving car, and enhancing the image quality of that region. When a user-set ROI is used, there is a problem that the image quality of the ROI is constantly enhanced even in a situation where there is no change in the video. On the other hand, when a dynamic ROI is used, the image quality is enhanced when there is a change in the video. However, there is a problem that the ROI is not set if the motion is small, so the image quality of the required region is not enhanced.

To cope with these problems, Japanese Patent Laid-Open No. 2006-93784 discloses a method of composing a region that includes both a user-set ROI and a dynamic ROI when they overlap, thereby generating an ROI. Japanese Patent Laid-Open No. 2015-36980 discloses a method in which a user-set ROI is set near the entrance in a parking lot, and when a dynamic ROI obtained from a result of car detection is included in the user-set ROI, it is started to track the dynamic ROI to specify where the car is parked, so that the occupancy rate of the parking lot is determined.

However, in the methods disclosed in Japanese Patent Laid-Open Nos. 2006-93784 and 2015-36980, the user needs to set an appropriate ROI in accordance with the scene, so that there is a problem that it is difficult to use the method appropriately when a region to be an ROI cannot be assumed in advance. Furthermore, in Japanese Patent Laid-Open No. 2006-93784, there is a problem that since the image qualities of all the dynamic ROIs are enhanced, the ROI becomes unnecessarily large when there is vegetation, a water surface, or the like that constantly moves.

SUMMARY OF THE INVENTION

The present invention provides an easier and more efficient image compression encoding technique.

According to the first aspect of the present invention, there is provided an image processing apparatus comprising: a specific object detection unit configured to detect a specific object from a moving image; a setting unit configured to set, in the moving image, based on a position of the specific object detected by the specific object detection unit, a region of interest which is a region for performing an encoding process that produces a relatively higher image quality than in another region other than the region of interest; a moving object detection unit configured to detect a moving object from the moving image; and an encoding unit configured to perform an encoding process using, in the region of interest, an encoding parameter that can produce a relatively higher image quality than an encoding parameter used in the other region, when the moving object is detected in the region of interest.

According to the second aspect of the present invention, there is provided an image processing method comprising: detecting a specific object from a moving image; setting, in the moving image, based on a position of the detected specific object, a region of interest which is a region for performing an encoding process that produces a relatively higher image quality than in another region; detecting a moving object from the moving image; and performing an encoding process using, in the region of interest, an encoding parameter that can produce a relatively higher image quality than an encoding parameter used in the other region, when the moving object is detected in the region of interest.

According to the third aspect of the present invention, there is provided a non-transitory computer-readable recording medium storing a program for causing a computer to function as: a specific object detection unit configured to detect a specific object from a moving image; a setting unit configured to set, in the moving image, based on a position of the specific object detected by the specific object detection unit, a region of interest which is a region for performing an encoding process that produces a relatively higher image quality than in another region other than the region of interest; a moving object detection unit configured to detect a moving object from the moving image; and an encoding unit configured to perform an encoding process using, in the region of interest, an encoding parameter that can produce a relatively higher image quality than an encoding parameter used in the other region, when the moving object is detected in the region of interest.

Further features of the present invention will become apparent from the following description of exemplary embodiments (with reference to the attached drawings).

DESCRIPTION OF THE EMBODIMENTS

Embodiments of the present invention will be described below with reference to the accompanying drawings. Note that the embodiments to be described below are merely examples when the present invention is practically implemented, and are practical embodiments of an arrangement set forth in the following claims.

First Embodiment

In this embodiment, when a specific object is detected from a frame image in a moving image, an ROI (Region of Interest) is set for the frame image based on the result of the detection (detection result). That is, an ROI based on a specific object is set for a frame image without intervention of a user operation.

Then, the frame image is encoded such that among the set regions of interest, the region that at least partially overlaps with the region of a moving object is encoded with relatively high image quality. That is, instead of constantly encoding all ROIs with high image quality, "the ROI at least partially overlapping with the region of a moving object" is encoded with high image quality, and other image regions are not encoded with high image quality. Thus, not only an increase in bit rate can be suppressed, but also effective encoding can be performed. Note that when a region of interest at least partially overlaps with a moving object region, it is determined that a moving object is detected in the region of interest. However, the present invention is not limited to this, and it may be determined that a moving object is detected in a region of interest when the center of gravity of the moving object enters the region of interest. It is assumed that encoding a region of interest with high image quality means that an encoding process is performed in the region of interest using an encoding parameter that can produce a relatively higher image quality than an encoding parameter used in another region. As will be described later, the encoding parameter is, for example, a quantization parameter. A smaller quantization parameter corresponds to a smaller quantization step. That is, a quantization parameter that can produce a relatively higher image quality than a quantization parameter used in another region is a quantization parameter that is relatively smaller than a quantization parameter used in the other region.

Figure 1:
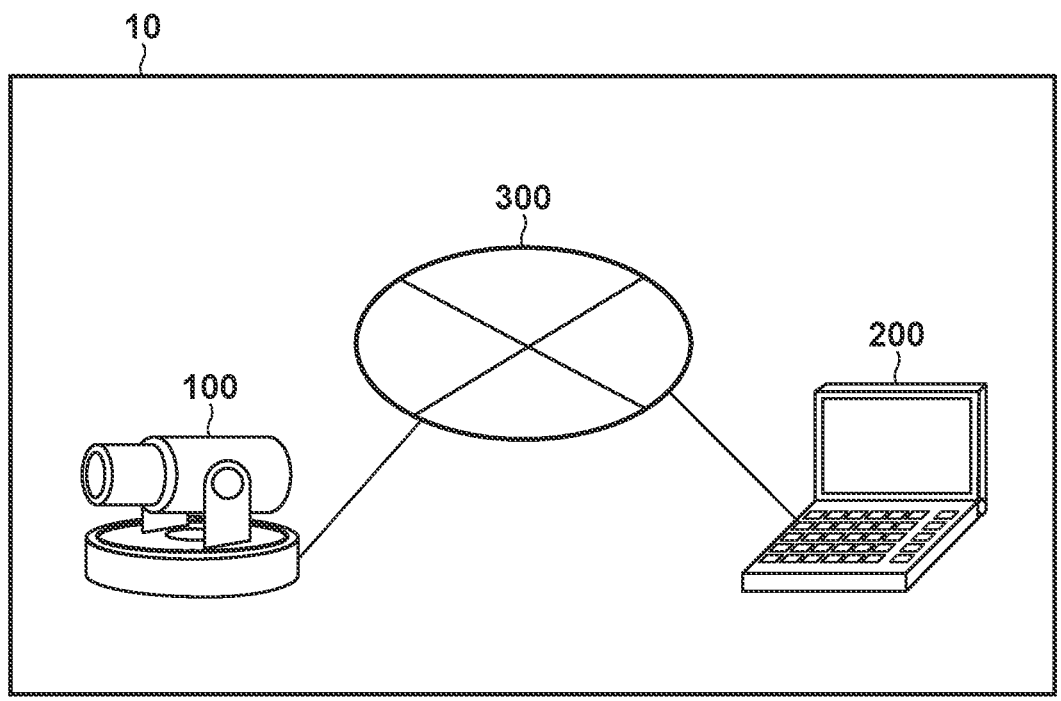
FIG. 1 is a view showing an arrangement example of an image processing system.

First, an arrangement example of an image processing system according to this embodiment will be described with reference to FIG. 1. As shown in FIG. 1, an image processing system 10 according to this embodiment includes an image capturing apparatus 100 and a client terminal apparatus 200. The image capturing apparatus 100 and the client terminal apparatus 200 are configured to be capable of data communication with each other via a wired and/or wireless network 300.

First, the image capturing apparatus 100 will be described. The image capturing apparatus 100 functions as an image processing apparatus that captures a moving image, and performs image processing and compression encoding on the captured image (frame image) of each frame of the captured moving image. The image capturing apparatus 100 transmits (distributes) a video stream to the client terminal apparatus 200 in response to a distribution request command from the client terminal apparatus 200. Further, the image capturing apparatus 100 performs various setting processes according to setting parameters and setting commands transmitted from the client terminal apparatus 200. An example of the hardware arrangement of the image capturing apparatus 100 will be described using a block diagram shown in FIG. 2B.

An image capturing unit 221 receives light beams formed on an imaging sensor via a lens, and converts the received light beams into electric charges, thereby acquiring a moving image. As the image sensor, for example, a CMOS (Complementary Metal Oxide Semiconductor) image sensor can be used. A CCD (Charge Coupled Device) image sensor may also be used as the image sensor. Note that the image capturing unit 221 is not limited to capturing a moving image, and it may also regularly or irregularly capture still images as frame images.

A storage unit 222 is formed by memory devices such as a ROM (Read Only Memory) and a RAM (Random Access Memory). The storage unit 222 stores the setting data and boot program of the image capturing apparatus 100, and computer programs and data for causing a control unit 223 to execute or control the respective processing operations described later as being performed by the image capturing apparatus 100. Further, the storage unit 222 appropriately provides various kinds of areas, such as an area for storing data (for example, setting data) received from the outside (for example, the client terminal apparatus 200) via a communication unit 224, and an area required by the control unit 223 to execute various processes.

For example, the storage unit 222 stores camera parameters that are settings such as white balance and exposure regarding the image capturing unit 221, compression encoding parameters regarding compression encoding, and the like. The compression encoding parameter includes a time (duration of high-image quality processing) to enhance the image quality of an ROI (to encode an ROI with high image quality), and quantization parameters respectively used inside and outside an ROI (to be referred to as qP values, hereinafter). A larger qP value corresponds to a larger quantization step, so that compression encoding using a larger qP value results in a lower image quality. The storage unit 222 can also store parameters regarding a frame image, including a frame rate of the frame image to be distributed to the client terminal apparatus 200, and the size (resolution) of the frame image.

Further, the storage unit 222 can function as a frame memory or a buffer memory. Note that in addition to memory devices such as a ROM and a RAM, a storage medium such as a flexible disk, a hard disk, an optical disk, a magnetooptical disk, a CD-ROM, a CD-R, a magnetic tape, a nonvolatile memory card, a DVD, or the like may be used as the storage unit 222.

The control unit 223 is formed by one or more processors such as a CPU (Central Processing Unit) or an MPU (Micro Processing Unit). The control unit 223 performs various processes using the computer programs and data stored in the storage unit 222. Thus, the control unit 223 controls the overall operation of the image capturing apparatus 100, and executes or controls the respective processing operations described later as being performed by the image capturing apparatus 100.

Note that the control unit 223 may control the entire image capturing apparatus 100 in cooperation with the computer programs and an OS (Operating System) stored in the storage unit 222. Note that the control unit 223 may be formed by a processor such as a DSP (Digital Signal Processor) or an ASIC (Application Specific Integrated Circuit).

The communication unit 224 transmits/receives a wired signal or a wireless signal to/from the client terminal apparatus 200 in order to perform data communication with the client terminal apparatus 200 via the network 300.

Figure 2A:
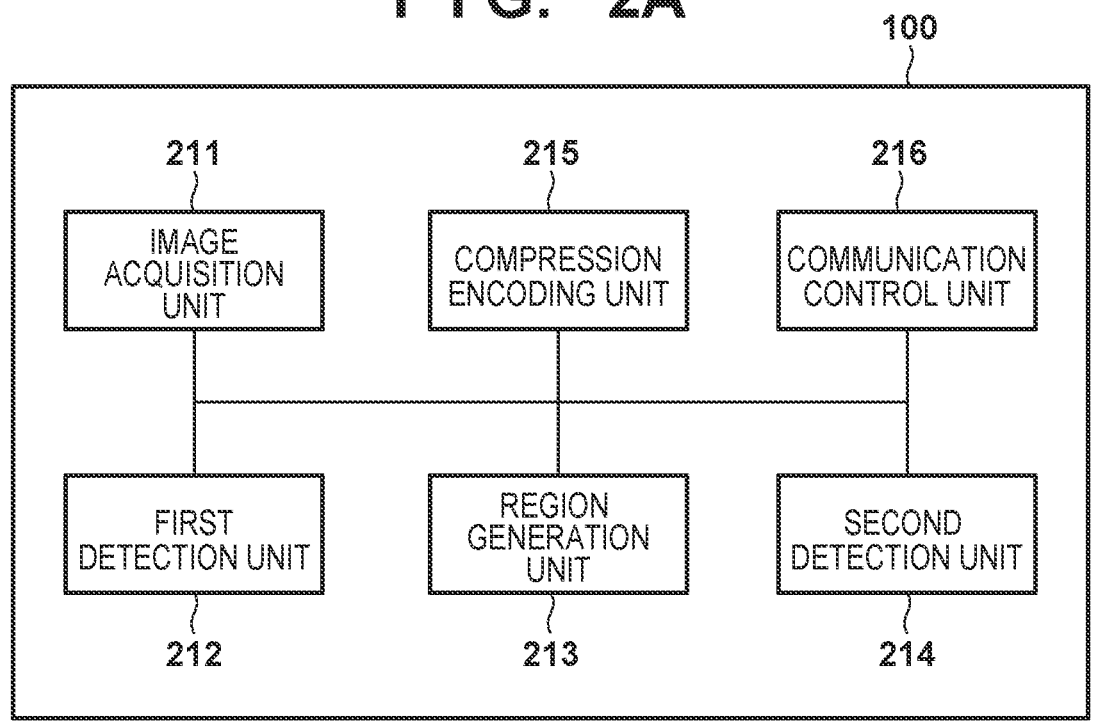
FIG. 2A is a block diagram showing an example of the functional arrangement of an image capturing apparatus 100.
Figure 2B:
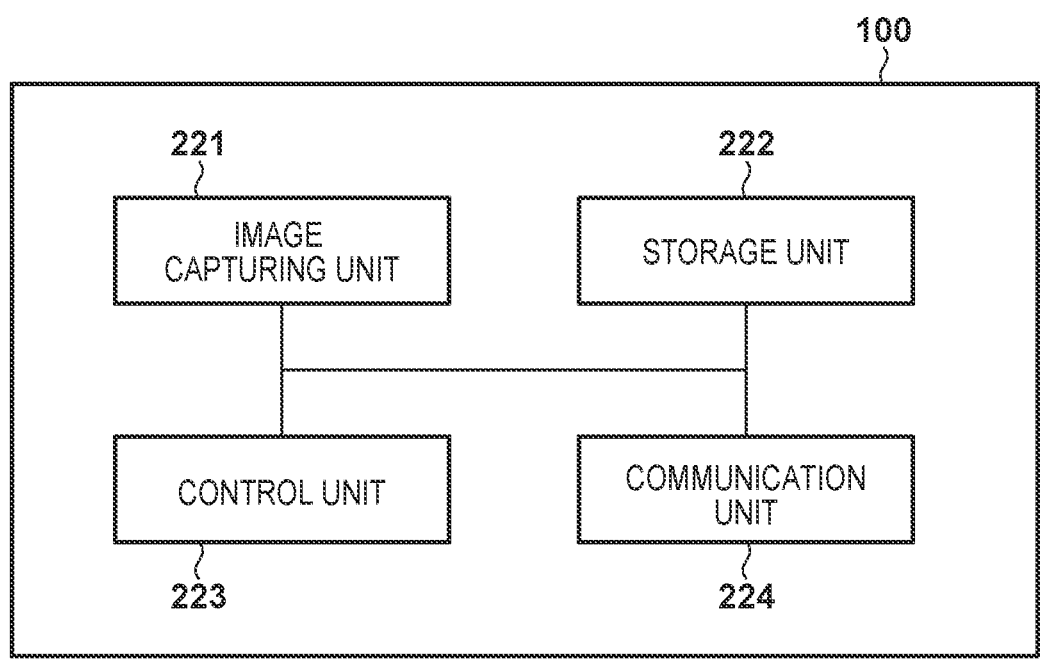
FIG. 2B is a block diagram showing an example of the hardware arrangement of the image capturing apparatus 100.

Next, an example of the functional arrangement of the image capturing apparatus 100 will be described using a block diagram shown in FIG. 2A. Note that in the following description, the functional unit shown in FIG. 2A may be described as a processing entity, but in practice, the function of the functional unit is implemented when the control unit 223 executes a computer program for causing the control unit 223 to implement the function corresponding to the functional unit shown in FIG. 2A. Note that the functional unit shown in FIG. 2A may be implemented by hardware.

An image acquisition unit 211 acquires a frame image captured by the image capturing unit 221, and performs various kinds of image processing on the frame image in accordance with various parameters received from the client terminal apparatus 200, thereby generating the frame image to be compression-encoded. Note that the acquisition source of the frame image is not limited to the image capturing unit 221, and it may be, for example, another apparatus connected to the network 300.

A first detection unit 212 detects a specific object from the frame image that has undergone the image processing by the image acquisition unit 211. There are various methods for detecting an object from an image, and the present invention is not limited to a specific method. For example, a known method of detecting a specific object from a frame image by generating a discriminator that learns the features of the specific object by machine learning and applying it to the frame image may be used.

A region generation unit 213 sets an ROI based on the detection result of a specific object by the first detection unit 212, and deletes an ROI from which the specific object has not been detected for a prescribed time.

A second detection unit 214 detects a moving object from the frame image that has undergone the image processing by the image acquisition unit 211. There are various methods for detecting a moving object from a frame image, and the present invention is not limited to a specific method. For example, an inter-frame difference method for detecting a motion region from a difference between frame images, and a background difference method for generating a background image and detecting a motion region as a foreground with respect to the background from a difference between the background and the foreground are known. These moving object detection methods are detection methods based on a difference value between a pixel value of a frame image as a detection target and a pixel value of another image (for example, a background image).

A compression encoding unit 215 performs compression encoding on the frame image in accordance with the compression encoding parameter stored in the storage unit 222. A communication control unit 216 controls the communication unit 224 to transmit the frame image that has undergone the compression encoding by the compression encoding unit 215 to the client terminal apparatus 200 via the network 300 in, for example, a stream format. Note that the transmission destination of the compression-encoded frame image is not limited to the client terminal apparatus 200, and the frame image may be transmitted to another apparatus via the network 300, or may be output to the storage unit 222.

The client terminal apparatus 200 will be described next. The client terminal apparatus 200 transmits various parameters and commands such as the above-described setting parameters and setting commands to the image capturing apparatus 100, and decodes the compression-encoded frame image transmitted from the image capturing apparatus 100. The decoded frame image may be transferred to another apparatus other than the client terminal apparatus 200, may be stored in a memory included in the client terminal apparatus 200, or may be displayed on a display device. The client terminal apparatus 200 is, for example, a computer apparatus such as a personal computer, a tablet-type terminal apparatus, or a smartphone, and includes a processor such as a CPU and a memory device such as a RAM or a nonvolatile memory.

Here, a problem in a case in which the region of a specific object or the region of a moving object in a frame image is set as an ROI and the ROI is compression-encoded with higher image quality than in other image regions will be described using FIGS. 3 and 4.

Figure 3:
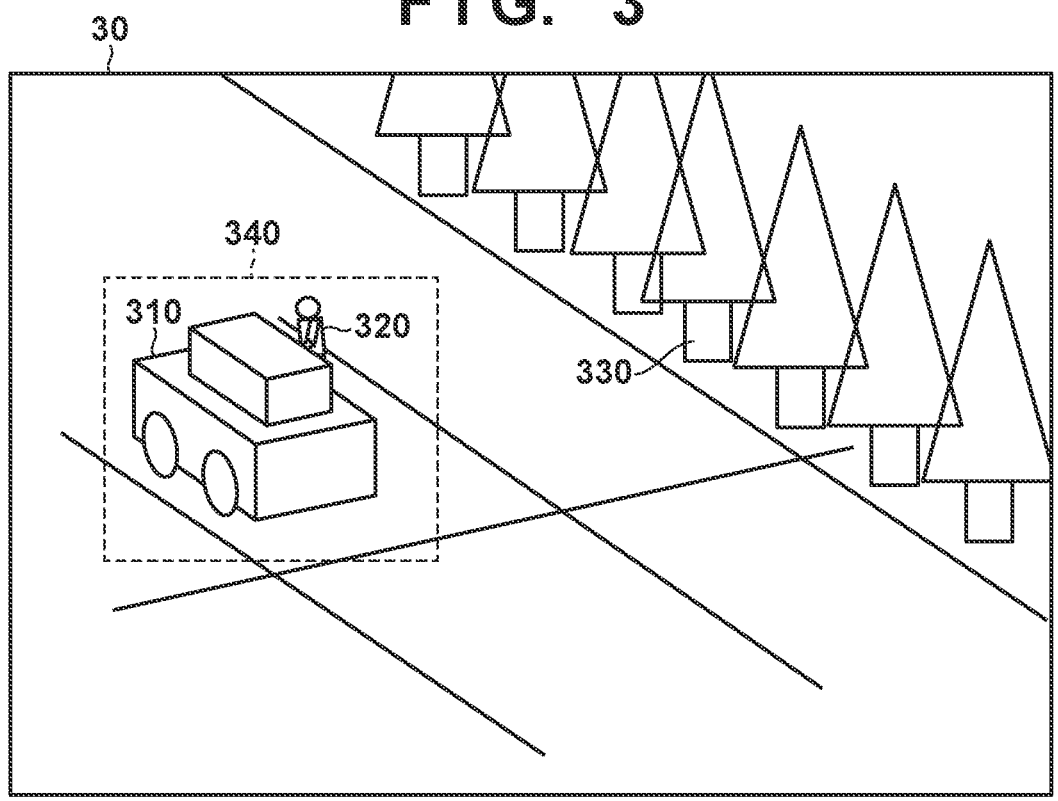
FIG. 3 is a view for explaining a specific object ROI.

A frame image 30 shown in FIG. 3 is a frame image generated by capturing a scene in a parking lot, and includes a car 310 parked in the parking lot, a person 320 existing around the car, and a cluster of trees 330 around the parking lot. FIG. 3 shows a case in which the car 310 is detected as a specific object, and a region including the car 310 is set as an ROI (specific object ROI) 340. If a specific object ROI is compression-encoded with higher image quality than in regions other than the specific object ROI, in the example shown in FIG. 3, the specific object ROI 340 is constantly compression-encoded with higher image quality than in the regions other than the specific object ROI 340 regardless of the motion of the car 310 and the motion in the surroundings.

Figure 4:
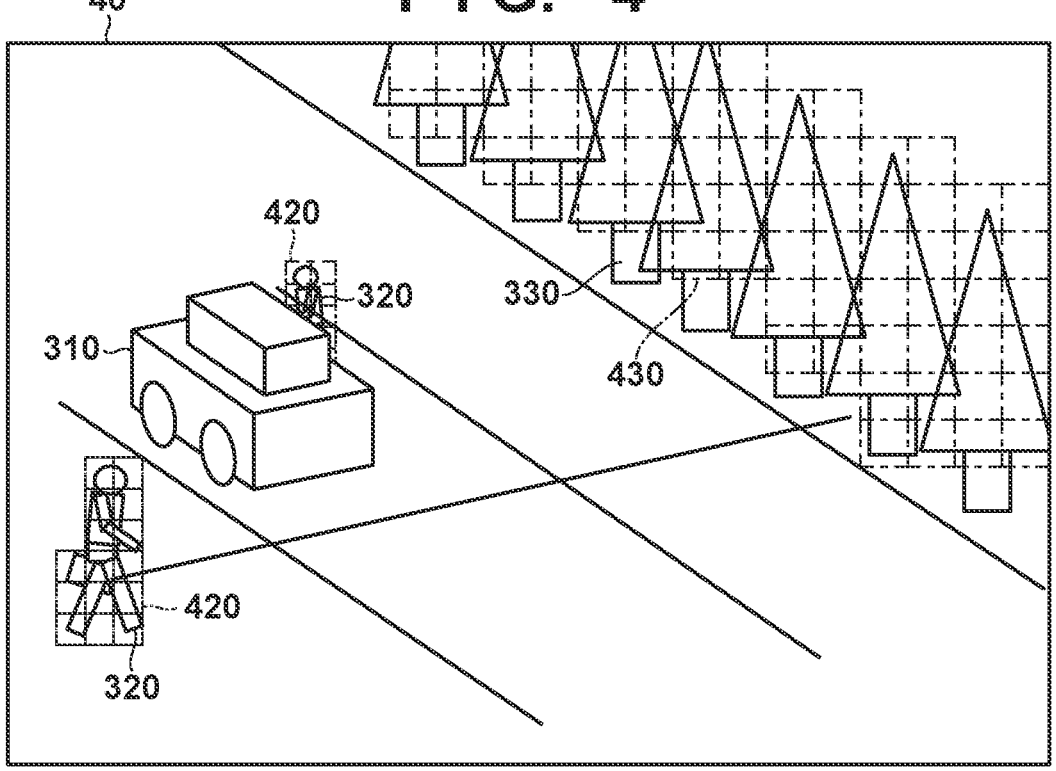
FIG. 4 is a view for explaining a dynamic ROI.

A frame image 40 shown in FIG. 4 is a frame image generated by capturing a scene in the parking lot. The frame image 40 includes the car 310 parked in the parking lot and serving as a still object, the person 320 existing around the car and serving as a moving object, and the cluster of trees 330 serving as a moving object around the parking lot. FIG. 4 shows a case in which the person 320 is detected as a moving object and a region including the person 320 is set as an ROI (dynamic ROI) 420. Further, the cluster of trees 330 is detected as a moving object and a region including the cluster of trees 330 is set as a dynamic ROI 430. If a dynamic ROI is compression-encoded with higher image quality than in regions other than the dynamic ROI, in the example shown in FIG. 4, the position of the region to enhance the image quality in the frame image 40 can be dynamically changed in accordance with the situation.

Here, in compression encoding, respective regions in an image can be quantized and encoded using different quantization parameters. As described above, compression using a larger qP value (quantization parameter value) results in a lower image quality. Since the compression efficiency increases as the ROI is smaller, it is preferable that the ROI is as small as possible in the examples shown in FIGS. 3 and 4. In the case of the specific object ROI 340 shown in FIG. 3, the specific object ROI 340 is constantly compressed with high image quality (low qP value) while the car is parked in the parking lot, so that the compression efficiency deteriorates. That is, unnecessary image quality enhancement can occur in a time direction.

On the other hand, the dynamic ROI 420 in FIG. 4 is compressed with high image quality only when there is a motion of the person 320, so that unnecessary image quality enhancement is reduced. However, when a motion of the person 320 is small or when the person 320 appears and hides behind the car 310, the motion may not be accurately detected, so the person 320 and its surroundings may not be set as a dynamic ROI and image quality enhancement may not be performed. Furthermore, when there is an object such as the cluster of trees 330 (in addition, a flapping flag or a water surface) that constantly moves, a region including such an object is constantly set as a dynamic ROI, so that unnecessary image quality enhancement may occur. In addition, when the image capturing apparatus 100 is installed for a monitoring purpose, as compared to a normal video camera, an acquired moving image has less motion or a target to be noticed is limited in many cases.

Compression encoding of a frame image according to this embodiment considering the above-described problems will be described with reference to a flowchart illustrated in FIG. 5. In step S510, the image acquisition unit 211 acquires the above-described various parameters and setting data from the storage unit 222. In this embodiment, it is assumed as an example that the size of a frame image is 3840 pixels×2160 pixels, a frame rate for distribution is 30 fps, the qP value inside the ROI is 35, and the qP value outside the ROI is 43.

In step S520, the image acquisition unit 211 acquires a group of frame images (frame images in a moving image, or a set of regularly or irregularly captured frame images). The image acquisition unit 211 performs various types of image processing on each of the acquired frame images in accordance with the various parameters acquired in step S510, thereby generating a frame image serving as a compression encoding target.

In step S530, processing regarding setting of a specific object ROI (addition or deletion of a specific object ROI) is performed. The details of the processing in step S530 will be described in accordance with a flowchart illustrated in FIG. 6.

In step S610, the first detection unit 212 selects one unselected frame image from a group of frame images generated in step S520 as a selected frame image, and detects a specific object from the selected frame image. Detection of a specific object from a frame image may be performed for each frame, or may be performed every few frames. Here, the processing in step S610 will be described by exemplifying the processing for detecting a car as a specific object from a frame image generated by capturing a scene in a parking lot.

As an example of car detection, there is known a method using a Haar-Like feature amount as an image feature amount and Adaboost as a learning algorithm. More specifically, an image including a car (car image) and an image not including a car (non-car image) are prepared, and Haar-Like feature amounts are extracted from the respective images. Then, by generating weak discriminators while selecting the feature amounts having high discrimination capability from the extracted feature amounts, an Adaboost strong discriminator for vehicle determination is generated.

By using a window for scanning the frame image as an input and discriminating whether a vehicle is included in the window, a car is detected together with its position if the car is included in the frame image.

Through detection of the specific object from the frame image, the position and size of the specific object in the frame image can be obtained. "The position of the specific object in the frame image" is, for example, the position (for example, the position of the center, the position of the center of gravity, or the position of any of the four corners) of the region of the specific object while setting the position of the upper left corner of the frame image as the origin. "The size of the specific object in the frame image" is represented by, for example, the number of pixels of the region of the specific object in a vertical direction and that in a horizontal direction.

In step S620, the region generation unit 213 acquires, from the storage unit 222, a table in which information regarding a currently set specific object ROI is registered. In this table, for each of the currently set specific object ROIs, the position and size of the specific object ROI and the length of a latest period during which the specific object has not been detected from the specific object ROI are registered.

"The position of the specific object ROI" is, for example, the position (for example, the position of the center, the position of the center of gravity, or the position of any of the four corners) of the specific object ROI while setting the position of the upper left corner of the frame image as the origin. "The size of the specific object ROI" is, for example, the number of pixels of the specific object ROI in the vertical direction and that in the horizontal direction.

"The length of a latest period during which the specific object has not been detected from the specific object ROI" is an elapsed time from the last detection of the specific object from the specific object ROI to the current time. When the specific object is detected from the specific object ROI, the elapsed time is reset to zero.

Note that at the time of the image acquisition unit 211 acquiring the first frame image (the captured image of the first frame), no specific object ROI has been set on the frame image yet, so nothing has been registered in the table and the empty table is registered in the storage unit 222.

Among the specific object ROIs registered in the table, the specific object ROI that does not include any of the specific objects detected in step S610 is set as a target in steps S630 and S640. The region generation unit 213 specifies the specific object ROI on the frame image using the position and size of each of the specific object ROIs registered in the table. Then, the region generation unit 213 selects the specific object ROI, among the specific object ROIs, that does not include the region or position of the specific object detected in step S610 as a target (target specific object ROI) in steps S630 and S640.

On the other hand, among the specific objects detected in step S610, the specific object that is not included in any of the specific object ROIs registered in the table is set as a target in steps S650 and S660. That is, the region generation unit 213 specifies the specific object ROI on the frame image using the position and size of each of the specific object ROIs registered in the table. Then, the region generation unit 213 sets the specific object, among the specific objects detected in step S610, whose position or region is not included in any of the specific object ROIs on the frame image as a target (target specific object) in steps S650 and S660.

In step S630, the region generation unit 213 determines whether a length T of a period during which the target specific object ROI is registered in the table without including the specific object is equal to or larger than a threshold. That is, for the specific object ROI that does not include any of the specific objects detected in step S610, the region generation unit 213 determines whether the elapsed time from the last detection of the specific object to the current time is equal to or larger than the threshold. As a result of the determination, if the period length T is equal to or larger than the threshold, the process advances to step S640, and if the period length L is smaller than the threshold, the process advances to step S535. Note that the threshold is assumed to be a fixed value (for example, three minutes) in this embodiment, but it may be changed in accordance with the situation.

In step S640, the region generation unit 213 deletes the information (position, size, and period length) regarding the target specific object ROI registered in the table, thereby deleting the target specific object ROI on the frame image.

On the other hand, the region generation unit 213 determines in step S650 whether the target specific object is a still object. For example, if a distance (movement amount) between the position of the target specific object detected in previous step S610 and that detected in current step S610 is smaller than a threshold distance (position error), the target specific object may be determined to be a still object. In this case, if the movement amount is equal to or larger than the threshold distance, the target specific object is not determined to be a still object. The threshold distance is assumed to be a fixed value (for example, three pixels) in this embodiment, but it may be changed in accordance with the situation, for example, in accordance with the position in the screen. Note that the method for determining whether a target specific object is a still object is not limited to a specific method.

As a result of the determination, if the target specific object is determined to be a still object, the process advances to step S660, and if the target specific object is determined not to be a still object, the process advances to step S535.

In step S660, the region generation unit 213 sets a region (for example, having the vertical and horizontal sizes 1.5 times larger than the vertical and horizontal sizes of the region of the target specific object) covering the region of the target specific object to be a specific object ROI. The region generation unit 213 additionally registers the position and size of the specific object ROI and its period length (=0) in the above-described table, thereby newly setting the specific object ROI based on the target specific object on the frame image.

Referring back to FIG. 5, in step S535, the region generation unit 213 determines whether a specific object ROI is set (whether the table is empty). As a result of the determination, if a specific object ROI is set (the table is not empty), the process advances to step S540. On the other hand, as a result of the determination, if no specific object ROI is set (the table is empty), the process advances to step S530.

In step S540, the second detection unit 214 detects a moving object from the selected frame image. Detection of a moving object from the frame image may be performed for each frame, or may be performed every few frames. A moving object may be detected from a range using the entire selected frame image as the range, or may be detected from a range using the specific object ROI set by the region generation unit 213 as the range. As a moving object detection method, a background difference method and an inter-frame difference method are known as described above. A moving object detection process using each method will be described below.

(1) Moving Object Detection Process Using Inter-Frame Difference Method

When using an inter-frame difference method, the second detection unit 214 operates as follows. A difference value between the pixel value of the captured image of the moving object detection target frame (for example, the current frame) and the pixel value of the captured image of the frame (for example, a preceding frame (reference frame)) captured at a different timing is calculated. Then, a partial region in which the difference value is equal to or larger than a threshold is detected as the region of a moving object (moving object region). Note that using the pixel value is an example, and another feature amount in the frame image may be used.

(2) Moving Object Detection Process Using Background Difference Method

When using a background difference method, the second detection unit 214 sets, as a background image, the captured image of the frame (reference frame) captured when no moving object is assumed to exist. Then, the second detection unit 214 calculates a difference value between the pixel value of the background image and the pixel value of the captured image of the moving object detection target frame (for example, the current frame). Note that using the pixel value is an example, and another feature amount in the frame image may be used. Then, the second detection unit 214 detects, as a moving object region, a partial region in which the difference value is equal to or larger than a threshold. Note that based on the position of a pixel whose difference value is equal to or larger than the threshold, the second detection unit 214 may detect a region including a pixel whose difference value is smaller than the threshold as a moving object region. For example, if a pixel whose difference value is smaller than the threshold is surrounded by pixels whose difference values are equal to or larger than the threshold, the second detection unit 214 may detect the pixel whose difference value is smaller than the threshold as a moving object region.

When using a background difference method, the following operation may be performed. That is, the second detection unit 214 divides the frame image into a plurality of regions (blocks), extracts a feature amount from each region, and compares the feature amount with the feature amount in the background image, thereby determining whether the region is a background or a foreground (moving object region). As an example, the size of one region is assumed to be 16 pixels×16 pixels, which is a unit of H.264 macroblock, but it can be changed in accordance with the size of the frame image or the like. Further, a conversion coefficient on a lower frequency side or the like used when DCT (Discrete Cosine Transform) transform is performed on the pixel luminance value in the region can be used as the feature amount. Color information or the like may also be used as the feature amount.

As the feature amount of the background image, an average value of the feature amounts of a plurality of frame images or the like may be used. Note that the feature amount of the background image can be prepared for each region. The feature amount for each region can be gradually updated as the image changes with time. As an update method, a method of replacing the image that is less frequently referred to as a background image with a new background image can be used. A method of updating the background image upon referring to it so as to reflect the feature amount of the region in the current frame can also be used. The former update method can cope with a case in which the background itself has changed, and the latter update method can cope with a case in which the background gradually changes due to changes in sunlight.

The second detection unit 214 compares, for each region, the extracted feature amount and the feature amount of one or more backgrounds, thereby determining whether the region is a background (non-moving object region) or a foreground (moving object region). Then, the second detection unit 214 performs post-processing such as isolated point removal (processing for setting the background surrounded by the pixels determined to be the foreground to the foreground), thereby determining the final moving object region.

Next, in step S550, the compression encoding unit 215 specifies the specific object ROIs on the selected frame image using the position and size of each of the specific object ROIs registered in the above-described table. Then, the compression encoding unit 215 determines whether, among the specific object ROIs on the selected frame image, any specific object ROI includes part or all of the region of the moving object detected in step S540. As a result of the determination, if any specific object ROI includes part or all of the region of the moving object detected in step S540 among the specific object ROIs on the selected frame image, the process advances to step S560. On the other hand, if no specific object ROI includes part or all of the region of the moving object detected in step S540 among the specific object ROIs on the selected frame image, the process advances to step S570.

Note that when a moving object is detected not from the entire selected frame image but from the specific object ROI, it may be determined in step S550 whether a moving object is detected from the specific object ROI.

In step S560, for the specific object ROI including part or all of the moving object region, the compression encoding unit 215 sets "35" as "the qP value inside the ROI". On the other hand, for the image region other than "the specific object ROI including part or all of the moving object region" in the selected frame image, the compression encoding unit 215 sets "43" as "the qP value outside the ROI".

Note that in step S560, the compression encoding unit 215 may further set a time for enhancing the image quality (duration of high-image quality processing) for "the specific object ROI including part or all of the moving object region". "The duration of high-image quality processing" is assumed to be registered in the storage unit 222 in advance.

Here, the signification of the duration of high-image quality processing will be described. As described with reference to FIGS. 3 and 4, around a car parked in a parking lot, there is a situation in which the person 320 hides behind the car so that its motion is occasionally hidden. However, it is desirable to continue the image quality enhancement in the specific object ROI while the person 320 serving as the target of the image quality enhancement exists around the car. Furthermore, if the image quality in the specific object ROI is switched between high image quality and low image quality in a short period of time, the visibility of the video can be deteriorated. Therefore, in this embodiment, once the specific object ROI is determined to at least partially include the moving object region and image quality enhancement is performed, the high-image quality processing is continued for the duration of high-image quality processing even if the moving object is not detected thereafter. That is, even if the specific object ROI is determined to at least partially include the moving object region but the moving object is not detected from the specific object ROI or the specific object ROI is determined not to include the moving object region thereafter, the high-image quality processing is performed for a certain period of time. Here, the high-image quality processing means encoding with higher image quality than in other image regions (for example, encoding while performing quantization in a smaller quantization step). Since the duration of high-image quality processing can vary depending on the scene, a user may be able to set it. Alternatively, the control unit 223 may manage the history of past moving object detection, and set the duration of high-image quality processing for each event.

In step S570, the compression encoding unit 215 sets the encoding such that even for the specific object ROI, no image quality enhancement is performed for the specific object ROI that does not include part or all of the moving object region, and the same image quality is obtained inside and outside the specific object ROI. As an example, for the selected frame image, the compression encoding unit 215 sets a common qP value "43" for the inside and outside of the specific object ROI.

In step S580, the compression encoding unit 215 performs compression encoding that quantizes and encodes the selected frame image using the qP value set in step S560 or the qP value set in step S570.

If the process advances from step S560 to step S580, the compression encoding unit 215 quantizes the specific object ROI including part or all of the moving object region using the qP value "35", and quantizes the image region other than the specific object ROI including part or all of the moving object region using the qP value "43". If the process advances from step S570 to step S580, the compression encoding unit 215 compresses the entire selected frame image using the qP value "43".

Then, the communication control unit 216 controls the communication unit 224 to transmit the frame image that has been compression-encoded by the compression encoding unit 215 in step S580 to the client terminal apparatus 200 via the network 300 in, for example, a stream format.

In step S590, the control unit 223 determines whether all the frame images of the frame image group generated in step S520 have been selected as a selected frame image. As a result of the determination, if all the frame images of the frame image group generated in step S520 have been selected as a selected frame image, the process according to the flowchart illustrated in FIG. 5 is completed. On the other hand, if any of the frame images generated in step S520 has not been selected as a selected frame image, the process advances to step S530.

Figure 5:
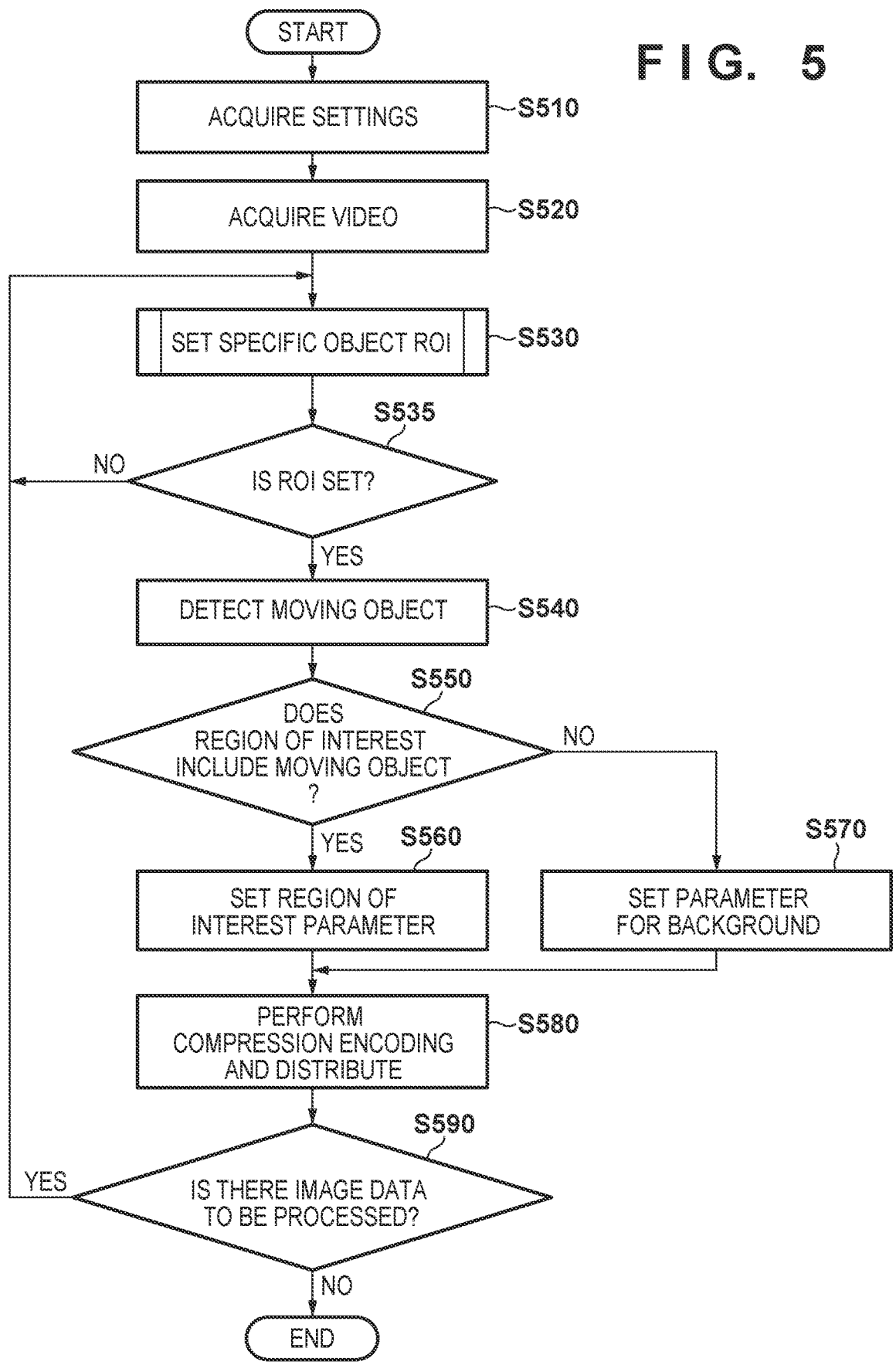
FIG. 5 is a flowchart illustrating compression encoding of a frame image.
Figure 7A:
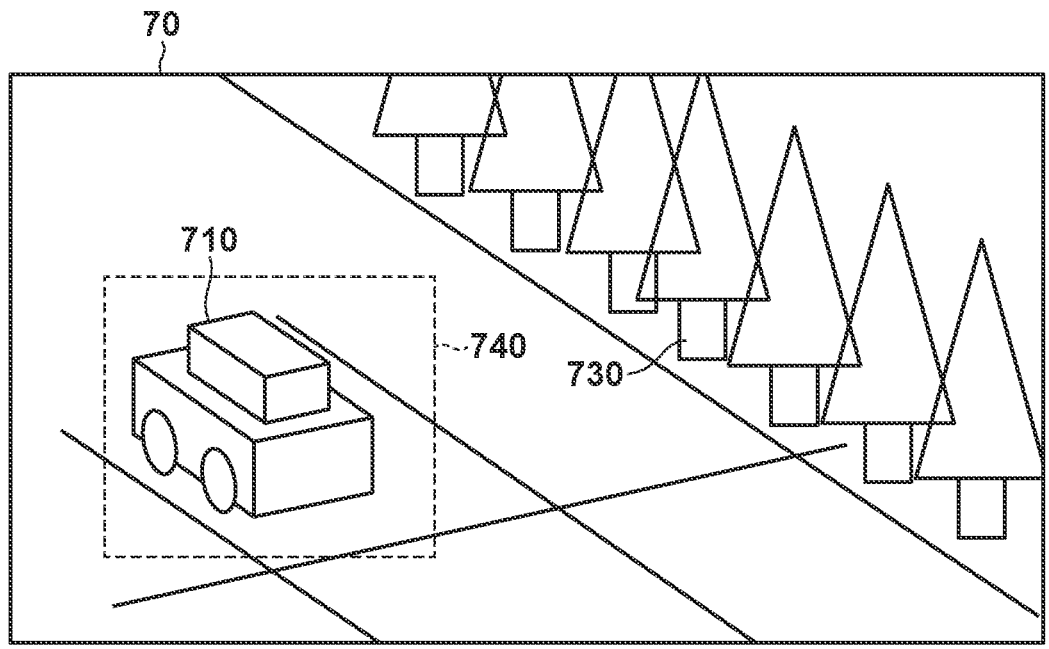
FIGS. 7A and 7B are views for visually explaining the processing in steps S550 to S570 shown in FIG. 5.
Figure 7B:
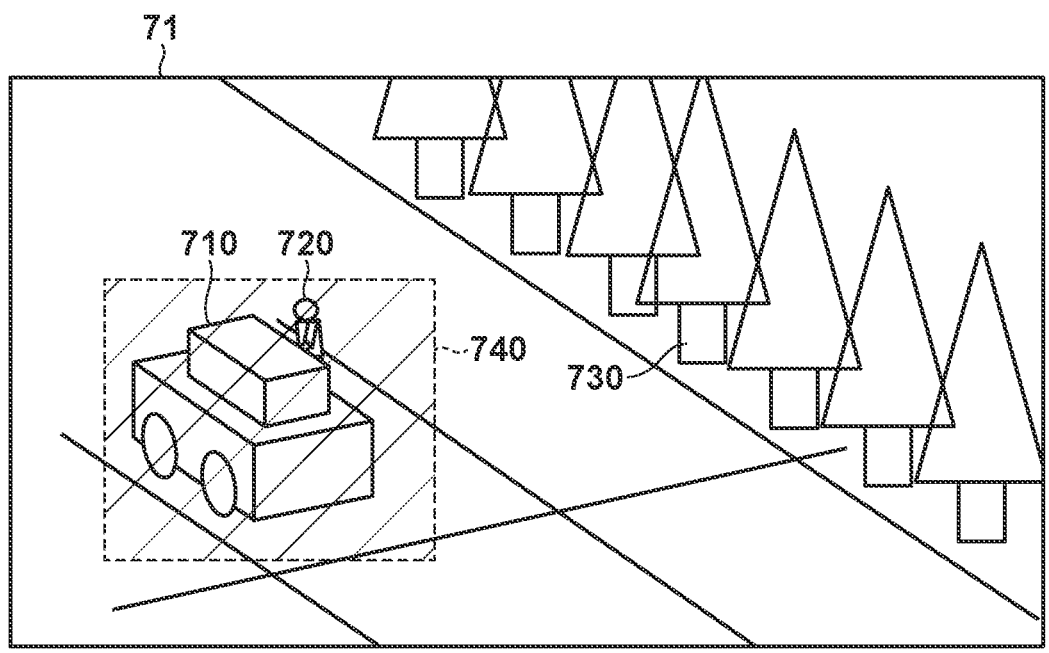

Next, with reference to FIGS. 7A and 7B, the processing in steps S550 to S570 in FIG. 5 will be visually described. FIGS. 7A and 7B show a frame image 70 and a frame image 71, respectively, each of which is generated by capturing a car parked in a parking lot and a scene around the car as in FIGS. 3 and 4.

In the frame image 70 in FIG. 7A, no moving object is included in a specific object ROI 740 for a car 710 serving as a specific object. Such the frame image 70 is, for example, a captured image generated by capturing a scene in which a car is parked in a parking lot with nobody at night. In this case, the compression encoding unit 215 does not enhance the image quality even for the specific object ROI 740. That is, the compression encoding unit 215 sets encoding such that the same image quality is obtained inside and outside the specific object ROI 740 (step S570), and performs compression encoding on the frame image 70 in accordance with the setting (step S580).

In the frame image 71 in FIG. 7B, a person 720 serving as a moving object is included in the specific object ROI 740 for the car 710 serving as a specific object. Such the frame image 71 is, for example, a captured image corresponding to a scene in which the person (suspicious person) 720 other than the owner of the car 710 approaches the car and looks inside the car 710. In this case, the compression encoding unit 215 enhances the image quality inside the specific object ROI 740. That is, the compression encoding unit 215 performs setting such that the specific object ROI 740 is encoded with higher image quality than in the image region other than the specific object ROI 740 (step S560), and performs compression encoding on the frame image 71 in accordance with the setting (step S580). In addition, if the duration of high-image quality processing is set, the compression encoding unit 215 enhances the image quality inside the specific object ROI 740 during the duration. Thus, for example, even if the person 720 as a suspicious person hides behind the car and only part of the body can be seen, or hardly moves, the image quality inside the specific object ROI 740 is continuously enhanced. Therefore, while the person 720 as a suspicious person exists around the car 710, the image quality inside the specific object ROI 740 can constantly be enhanced.

As described above, according to this embodiment, even for the ROI, no image quality enhancement is performed if an event with any motion does not occur therein. Accordingly, the bit rate can be reduced. Furthermore, if the ROI at least partially includes the moving object region, the image quality of the entire necessary region (that is, the ROI) is enhanced. Accordingly, it is possible to prevent the fluctuation of the region to be processed with high image quality depending on the accuracy of moving object detection, and as a result, it is possible to prevent uncollected information.

Second Embodiment

In the following embodiments including the second embodiment, differences from the first embodiment will be described, and the embodiments are assumed to be similar to the first embodiment unless otherwise specified. In the first embodiment, a parking lot scene has been assumed and a case in which a specific object is a car has been described. However, various specific objects are conceivable depending on use cases. For example, a bicycle in a bicycle parking lot, a suitcase in an airport scene, a ship at sea, a train or an airplane in a vehicle base, and products stored in a store or warehouse are conceivable. If the specific object to be detected changes, the method for generating a specific object ROI based on the detection result may change. A procedure of processing in such a case will be described.

In this embodiment, not only a car but various things, such as a bicycle, a suitcase, a train, and an airplane, are used as specific objects. Therefore, in step S610 according to this embodiment, an object corresponding to the specific object is detected from a selected frame image. Also in this embodiment, as a specific object detection method, an object detection method based on machine learning can be used as in the first embodiment. At this time, if the specific object is a bicycle, it is necessary to collect bicycle images as learning images, and if the specific object is a suitcase, it is necessary to collect suitcase images. As in the first embodiment, for those images, a Haar-Like feature amount is used as an image feature amount and Adaboost is used as a learning algorithm, so that a specific object discriminator that detects a bicycle or a suitcase from a selected frame image can be generated.

Figure 6:
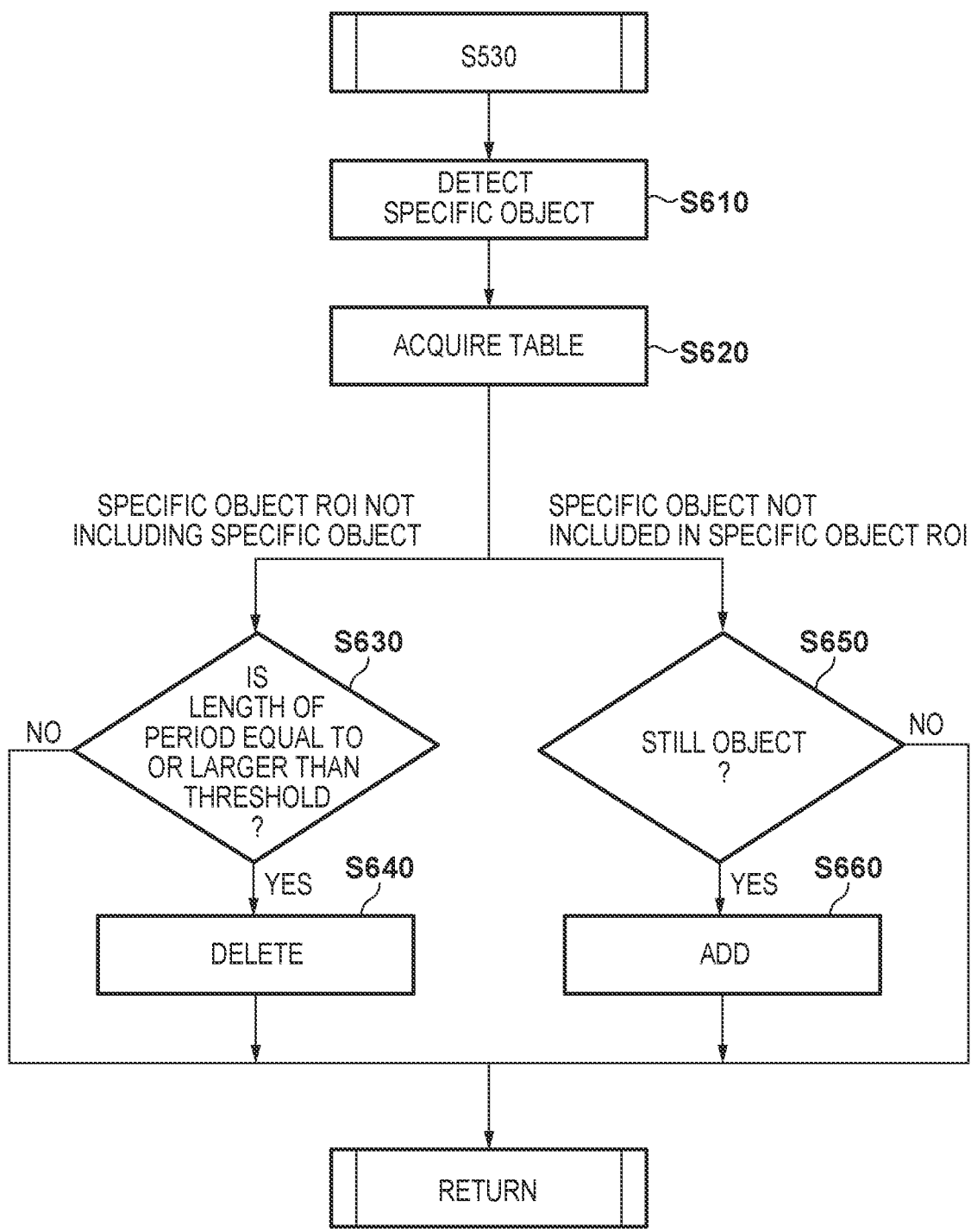
FIG. 6 is a flowchart illustrating the details of the processing in step S530 according to the first embodiment.
Figure 8:
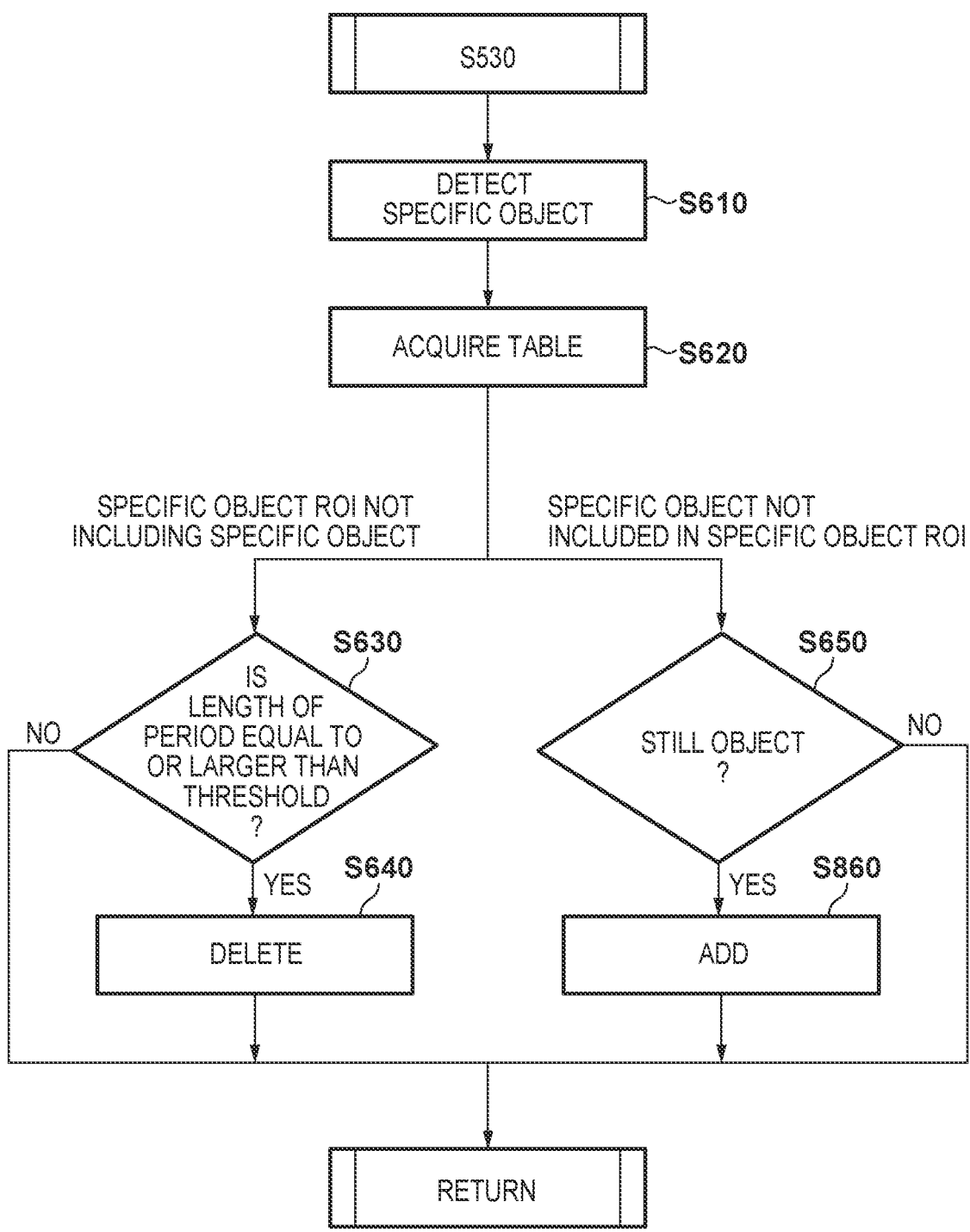
FIG. 8 is a flowchart illustrating the details of the processing in step S530 according to the second embodiment.

In this embodiment, the processing according to the flowchart illustrated in FIG. 8 is performed in step S530. In FIG. 8, the processing step similar to that shown in FIG. 6 is denoted by the same step number, and a description thereof will be omitted.

In step S860, the region generation unit 213 sets a region including the region of a target specific object as a specific object ROI, but the setting method is different from that in the first embodiment. That is, in this embodiment, a specific object ROI is set while assuming the movement range of a person existing around the specific object.

For example, when the specific object is a bicycle or a suitcase, it can be assumed that the face of the person who handles the specific object is located at a higher position than the center of gravity of the specific object. Therefore, when the specific object is a bicycle or a suitcase, it is desirable to set, as a specific object ROI, a region obtained by expanding the region of the detected specific object upward with reference to its center of gravity.

Figure 9:
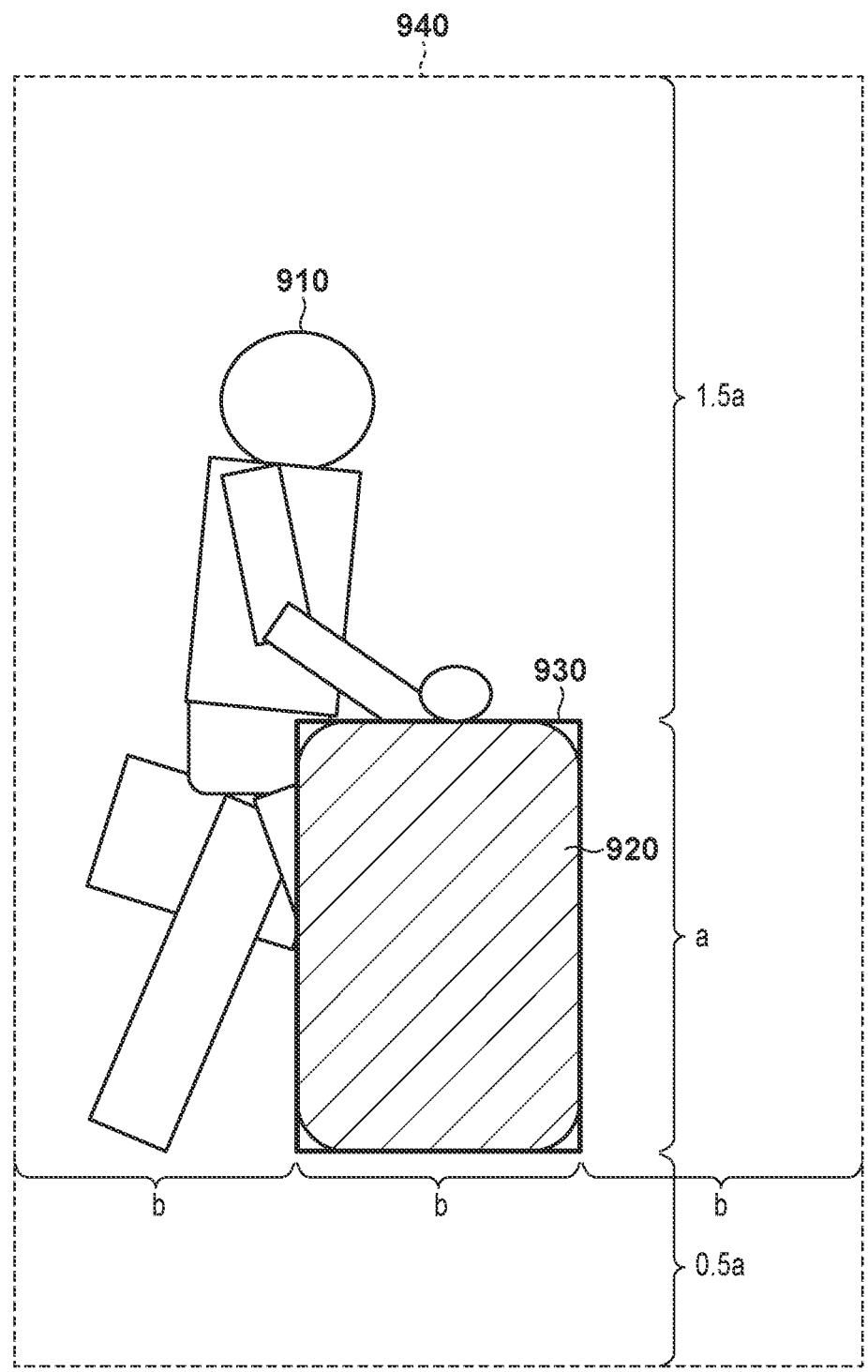
FIG. 9 is a view showing an example of a specific object ROI.

An example of the specific object ROI set when a suitcase is detected as a specific object is shown in FIG. 9. A person 910 is walking with a suitcase 920 in an airport scene or the like. A region 930 is a detection result of the suitcase 920 (the region of the suitcase 920). As shown in FIG. 9, the vertical size and horizontal size of the region 930 are represented by a and b, respectively. At this time, the upper side of a specific object ROI 940 set for the suitcase 920 is set at a position moved by 1.5a upward from the upper side of the region 930, and the lower side of the specific object ROI 940 is set at a position moved by 0.5a downward from the lower side of the region 930. Further, the left side of the specific object ROI 940 is set at a position moved by b from the left side of the region 930 to the left, and the right side of the specific object ROI 940 is set at a position moved by b from the right side of the region 930 to the right. That is, a region obtained by expanding the region 930 vertically and horizontally with a magnification according to the situation is used as the specific object ROI 940.

Note that there are various sizes of suitcases, and there are smaller suitcases. A specific object ROI to be set in that case is a region obtained by expanding the region of the suitcase with a higher magnification. Note that the magnification can be changed in accordance with the type of suitcase detected in detection of the specific object. It is also conceivable to change the magnification in accordance with the location where a camera is installed. For example, in a case of a camera installed in a space after an airport baggage counter, there are only suitcases of carry-on baggage size, so that a specific object ROI that is expanded further upward accordingly is set.

Furthermore, the magnification may be changed in accordance with the positional relationship between a camera and an object. When an object is captured almost laterally as shown in FIG. 9, the magnification may be as shown in FIG. 9. However, when a camera is installed at a high position and captures an object from above, the specific object ROI may be a region obtained by expanding the region of the object in all directions around its center of gravity regardless of top/bottom/left/right.

In addition, various parameters regarding the specific object ROI may be changed in accordance with the type (attribute) of the specific object. For example, in the case of car detection in the first embodiment, different parameters may be set depending on the vehicle type. For example, for a vehicle type that has been reported to have a large number of damages such as car break-in, in addition to expanding the specific object ROI, the duration to continue the high-image quality processing even after no moving object is included in the specific object ROI may be increased. Furthermore, it is also possible to change a qP value used for high-image quality processing in accordance with the vehicle type. That is, the image quality of the specific object ROI is controlled in accordance with the attribute of the specific object in the specific object ROI (in the region of interest).

In the first embodiment, the same duration of high-image quality processing and the same qP value used for high-image quality processing are set for all the specific object ROIs. However, in this embodiment, different values can be set in accordance with the attribute (the vehicle type for a car) of the detected specific object. The same can be applied to products located in a store or warehouse. As for products located in a store or warehouse, it is possible to set a specific object ROI only for a product that is often stolen.

As described above, in this embodiment, various objects can be applied as a specific object. A discriminator used for detection of a specific object can be configured by collecting and learning a large number of images of a target to be detected. Similarly, it is possible to specify the attribute of the specific object by configuring a discriminator suitable for the purpose by collecting corresponding learning data. Then, depending on the target to be detected, the values of various parameters related to the method for generating a specific object ROI and the high-image quality processing can be changed. Further, the method for expanding the specific object ROI may be set in accordance with the positional relationship between a target, whose image quality is required to be enhanced as the specific object ROI, and the specific object. A specific object ROI may be set based on the positional relationship between a camera and an object.

Third Embodiment

Assume a case in which when it is desired to perform road parking crackdown, a specific object ROI is set for a car parked on the road, and the image quality of the specific object ROI is preferably enhanced when the driver returns. At this time, the specific object ROI is set only for a car parked in a parking prohibited area, so that a car stopping and waiting for a traffic signal to change and a car parked in a parking area are preferably excluded.

In an image capturing apparatus 100 assuming such a case, a user may specify a range to detect a specific object in advance, and detection of the specific object may be performed only within the specified range. Alternatively, even when the entire frame image is set as the range to detect the specific object, a specific object ROI may be set only for the specific object detected within the range specified by the user.

Fourth Embodiment

The process is performed regardless of the type of moving object in the first to third embodiments, but only a moving object of a specific type among the moving objects in a frame image may be used as a target. For example, the target of moving object detection may be limited to a person or the like. By adding such a limitation, even when a small animal such as a dog or a cat, or a bird such as a crow appears in the frame image, it is not detected as a moving object and does not trigger the high-image quality processing, so that it is possible to achieve image quality enhancement with less waste.

Fifth Embodiment

In the first to fourth embodiments, it has been described that the entire specific object ROI including a moving object undergoes image quality enhancement. However, in accordance with the situation, only a partial region of a specific object ROI including a moving object may undergo image quality enhancement.

More specifically, a very large specific object ROI is set for a large specific object such as an airplane located in a vehicle base, but even if a suspicious person appears there, it is wasteful to enhance the image quality of the entire specific object ROI including the entire airplane.

Therefore, in such a case, enhancing the image quality of only the moving object region in the specific object ROI leads to more efficient encoding. Therefore, assuming such a case, when a moving object is detected in the specific object ROI, a mode for enhancing the image quality of the entire specific object ROI and a mode for enhancing the image quality of only the moving object region in the specific object ROI may be provided. If the above-described setting command includes a command for specifying which mode to use, an image capturing apparatus 100 operates in the specified mode in accordance with the setting command received from a client terminal apparatus 200.

Sixth Embodiment

In the first to fifth embodiments, image capturing for a monitoring purpose has been exemplified. However, the present invention can be applied to image capturing techniques for various purposes such as a broadcasting purpose. Also, the image capturing apparatus 100 has been described as being connected to the network 300 in the first to fifth embodiments, but it may not be connected to the network 300.

In the first to fifth embodiments, it has been described that the image capturing apparatus 100 captures a moving image, and performs image processing and compression encoding on a captured image (frame image) of each frame of the captured moving image, but the present invention is not limited to this. For example, an image capturing apparatus 100 may capture an image, and a computer apparatus connected to the image capturing apparatus 100 may perform image processing and compression encoding on a captured image (frame image) of each frame of the captured moving image. For example, the arrangement shown in FIG. 2B but excluding the image capturing unit 221 can be applied to the computer apparatus in this case. That is, the process described above as to be performed by the image capturing apparatus 100 may be shared and executed by a plurality of apparatuses.

The specific numerical values used in the first to fifth embodiments are illustratively used to provide more specific explanation, and are not intended to be limited to these numerical values.

Some or all of the respective embodiments described above may be used in appropriate combination. Further, some or all of the respective embodiments described above may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-211699, filed Nov. 9, 2018, which is hereby incorporated by reference herein in its entirety.

What is claimed is:

1. An image processing apparatus comprising:
   (a) one or more processors that execute instructions and/or (b) one or more circuits, configured so as to act as a plurality of units comprising:
   (1) a specific object detection unit configured to detect a specific object from an image;
   (2) a setting unit configured to set a region of interest in the image based on an image region of the specific object detected by the specific object detection unit;
   (3) a moving object detection unit configured to detect a moving object from the image; and
   (4) an encoding unit configured to (a) encode, using a first encoding parameter, a region of interest from which the moving object is not detected, the region of interest being among a plurality of regions of interest that are set by the setting unit, and (b) encode, using a second encoding parameter capable of encoding with a relatively higher image quality than the first encoding parameter, a region of interest from which the moving object is detected, the region of interest being among the plurality of regions of interest that are set by the setting unit.

2. The apparatus according to claim 1, wherein the setting unit sets the region of interest in the image based on an image region of the specific object which is determined as a still object.

3. The apparatus according to claim 1, wherein the encoding unit encodes, using the first encoding parameter, another region other than the region of interest that is set by the setting unit.

4. The apparatus according to claim 1, wherein the setting unit deletes, from among the plurality of regions of interest that are set by the setting unit, a region of interest from which the specific object has not been detected for a predetermined time or more.

5. The apparatus according to claim 1, wherein the setting unit sets, as the region of interest, a region obtained by expanding an image region of the specific object.

6. The apparatus according to claim 5, wherein the setting unit determines a magnification for expanding the image region of the specific object in accordance with an attribute of the specific object.

7. The apparatus according to claim 1, wherein the encoding unit encodes, using the second encoding parameter, a region of interest from which the moving object is detected continuously during a period in accordance with an attribute of the specific object.

8. The apparatus according to claim 1, the encoding unit encodes, using the second encoding parameter in accordance with an attribute of the specific object corresponding to the region of interest from which the moving object is detected, a region of interest from which the moving object is detected.

9. The apparatus according to claim 1, wherein each of the first encoding parameter and the second encoding parameter is a quantization parameter.

10. The apparatus according to claim 1, wherein the moving object detection unit detects a foreground from the image using a background difference method to detect the foreground as the moving object.

11. The apparatus according to claim 1, further comprising an image capturing unit configured to capture the image.

12. An image processing method comprising:
   detecting a specific object from an image;
   setting a region of interest in the image based on an image region of the detected specific object;
   detecting a moving object from the image; and
   encoding, using a first encoding parameter, a region of interest from which the moving object is not detected, the region of interest being among a plurality of regions of interest that are set by the setting; and
   encoding, using a second encoding parameter capable of encoding with a relatively higher image quality than the first encoding parameter, a region of interest from which the moving object is detected, the region of interest being among the plurality of regions of interest that are set by the setting.

13. A non-transitory computer-readable recording medium storing a program for causing a computer to function as:
   (1) a specific object detection unit configured to detect a specific object from an image;
   (2) a setting unit configured to set a region of interest in the image based on an image region of the specific object detected by the specific object detection unit;
   (3) a moving object detection unit configured to detect a moving object from the image; and
   (4) an encoding unit configured to (a) encode, using a first encoding parameter, a region of interest from which the moving object is not detected, the region of interest being among a plurality of regions of interest that are set by the setting unit, and (b) encode, using a second encoding parameter capable of encoding with a relatively higher image quality than the first encoding parameter, a region of interest from which the moving object is detected, the region of interest being among the plurality of regions of interest that are set by the setting unit.

* * * * *